United States Patent
Kiehn et al.

(10) Patent No.: US 11,506,761 B2
(45) Date of Patent: Nov. 22, 2022

(54) METHOD AND DEVICE FOR OPTICAL DISTANCE MEASUREMENT

(71) Applicant: Ibeo Automotive Systems GmbH, Hamburg (DE)

(72) Inventors: Michael Kiehn, Hamburg (DE); Wolfgang Birnbacher, Hamburg (DE)

(73) Assignee: IBEO AUTOMOTIVE SYSTEMS GMBH, Hamburg (DE)

( * ) Notice: Subject to any disclaimer, the term of this patent is extended or adjusted under 35 U.S.C. 154(b) by 729 days.

(21) Appl. No.: 16/548,156

(22) Filed: Aug. 22, 2019

(65) Prior Publication Data
US 2020/0064447 A1   Feb. 27, 2020

(30) Foreign Application Priority Data

Aug. 23, 2018 (EP) .................................. 18190429

(51) Int. Cl.
*G01S 7/484* (2006.01)
*G01S 7/487* (2006.01)
(Continued)

(52) U.S. Cl.
CPC ............ *G01S 7/484* (2013.01); *G01S 7/4808* (2013.01); *G01S 7/4876* (2013.01); *G05D 1/0242* (2013.01); *G05D 1/0248* (2013.01)

(58) Field of Classification Search
CPC ...... G01S 7/484; G01S 7/4808; G01S 7/4876; G01S 17/10; G01S 17/931; G01S 7/4865; G01S 7/487; G05D 1/0242; G05D 1/0248
See application file for complete search history.

(56) References Cited

U.S. PATENT DOCUMENTS

| 4,699,508 A | * | 10/1987 | Bolkow | ................ G01S 7/4865 356/5.07 |
| 2015/0070683 A1 | * | 3/2015 | Lepere | .................... G01S 17/10 356/5.01 |

(Continued)

FOREIGN PATENT DOCUMENTS

EP   2157445   2/2010

OTHER PUBLICATIONS

EPO Search Report for European Pat. App. No. 18190429.3 (corresponding to U.S. Appl. No. 16/548,156), dated Feb. 13, 2019.

*Primary Examiner* — Tyler J Lee
*Assistant Examiner* — Yufeng Zhang
(74) *Attorney, Agent, or Firm* — Porter Wright Morris & Arthur LLP (57) ABSTRACT

A method for optical distance measurement is proposed which comprises the emission of a plurality of measurement pulses, the reflection of emitted measurement pulses at at least one object and the receipt of reflected measurement pulses. A sequence of measurement pulses is emitted, wherein the sequence comprises temporal pulse spacings between temporally successive measurement pulses, and wherein each measurement pulse of the sequence has a temporal pulse width of T(Pulse). The pulse spacings form a first set, wherein the first set is defined by {T(delay)+i*T(Pulse): i is an element of the natural numbers between 0 and j}, wherein for all values of i it holds that: T(delay)+i*T(Pulse)<(2T(delay)+2T(Pulse)), wherein the first set only comprises one element for all values of i between 0 and j, respectively, and wherein T(delay) defines a pulse spacing base unit.

14 Claims, 4 Drawing Sheets

(51) Int. Cl.
  *G01S 7/48*   (2006.01)
  *G05D 1/02*   (2020.01)

(56) References Cited

U.S. PATENT DOCUMENTS

2018/0188358 A1   7/2018   Li et al.
2018/0188368 A1   7/2018   Zuffada et al.

* cited by examiner

METHOD AND DEVICE FOR OPTICAL DISTANCE MEASUREMENT

CROSS-REFERENCE TO RELATED APPLICATIONS

This application claims priority to European Patent Application No. 18190429.3, filed on Aug. 23, 2018. The entirety of the foregoing application is incorporated by reference herein.

TECHNICAL FIELD

The invention relates to a method and a device for optical distance measurement.

PRIOR ART

Optical distance measurements, in particular for application in the driverless navigation of vehicles are known from the prior art. They are based on the time-of-flight principle, wherein a scanning sensor, in particular a LIDAR (short for "light detection and ranging") sensor is used for the measurement, which sensor emits periodic measurement pulses which are reflected at objects, wherein the reflected measurement pulses are detected. From the determination of the transit time of the measurement pulses from the sensor to the objects and back, the distance to these objects can be determined with the aid of the speed of light.

For the maximum range of a time-of-flight measuring device operating according to the time correlated single photon counting (TCSPC) method, the delivered energy is an essential parameter. In this case, it is irrelevant in principle in which time interval the energy is delivered. The aim for the application is to achieve a largest possible measurement range.

Since the technically feasible pulse powers are limited and the measurement accuracy decreases with propagation of the emitted measurement pulses, it is possible to distribute the energy required to achieve a measurement range over several measurement pulses. As a result, aliasing effect can occur however. This means that the reflection of one measurement pulse cannot be uniquely assigned to an emitted measurement pulse. As a result, false object positions are obtained which, according to the prior art, cannot be distinguished from the actual object position.

In order to avoid these aliasing effects, the transmitted pulses in the prior art cannot be emitted arbitrarily rapidly in succession since otherwise no clear assignment of the reflection is possible. At the same time, the transit time of the measurement pulse, that is the time required by a measurement pulse before it reaches the sensor again cannot be speeded up. In order to therefore scan a large distance range, after emission of a measurement pulse it is necessary to wait for twice the transit time up to the most distant possible object until a measurement pulse can be delivered again.

If the energy is now distributed over several pulses and these are emitted very close to one another, the actual transit time of this sequence of measurement pulses, cannot be unambiguously determined when evaluating the received signals, in particular due to the occurrence of several auxiliary maxima. As a result, the distribution of the required energy to several measurement pulses restricts the maximum measurement range in the prior art.

DESCRIPTION OF THE INVENTION: OBJECT, SOLUTION, ADVANTAGES

The object of the present invention is to improve a method and a device for distance measurement in such a manner that measurement pulses in the form of a sequence can be emitted, wherein however no aliasing effects occur or these are minimized and thus the transit time of the sequence can be unambiguously determined. At the same time the emitted energy should be maximized.

The aforesaid object is solved by a method for optical distance measurement which comprises the emission of a plurality of measurement pulses, the reflection of emitted measurement pulses at at least one object and the receipt of reflected measurement pulses A sequence of measurement pulses is emitted, wherein the sequence comprises temporal pulse spacings between temporally successive measurement pulses, and wherein each measurement pulse of the sequence has a temporal pulse width (23) of T(Pulse). The pulse spacings form a first set, wherein the first set is defined by {T(delay)+i*T(Pulse): i is an element of the natural numbers between 0 and j}, wherein for all values of i it holds that: T(delay)+i*T(Pulse)<(2T(delay)+2T(Pulse)), wherein the first set only comprises one element for all values of i between 0 and j, respectively, and wherein T(delay) defines a pulse spacing base unit (25).

A measurement pulse reflected by the object comprises a measurement pulse which was emitted previously so that its direction of propagation as changed due to the reflection at the object. The reflected measurement pulse can thus be understood as an echo of the emitted measurement pulse. In particular, the transit time of the measurement pulses to the object at which these were reflected is determined by means of the method and from this the distance covered by the respective measurement pulse to the object is determined with the aid of the speed of light.

An optical distance measurement is characterized in that distances are determined by using optical signals, here optical measurement pulses. The distance covered by the measurement pulse is to be understood as the distance between the transmitting element which has emitted the measurement pulse and the object which has reflected this plus the distance between the object and the receiving element which has received the corresponding reflected measurement pulse. In particular, the method comprises allowance for the precise position of the transmitting element and the receiving element, in particular in relation to one another. Since the at least one object typically comprises a three-dimensional object so that some regions of the object can be arranged closer and other regions of the object can be arranged further away, the term "distance to the object" means the distance to at least one point of the object and specifically the point at which the measurement pulse was incident and at which this was reflected. Transit time is to be understood as the time which the measurement pulse has taken to cover the previously described distance. The method is preferably used for distance measurement for application in driverless navigation of vehicles.

A measurement pulse comprises in particular an electromagnetic, in particular an optical signal. This signal preferably has a wavelength which is not from the visible range for the human eye. Preferably for safety reasons invisible infrared is used. Since the measurement pulse comprises an electromagnetic signal and therefore the speed of the measurement pulse is known, the distance covered by the measurement pulse can be concluded from the transit time of a measurement pulse by means of the speed of light.

The term "sequence" means in particular a temporal sequence of measurement pulses. In this case, the sequence is in particular defined by a pattern which is determined by the number of measurement pulses, the pulse widths thereof and the temporal pulse spacings between the measurement pulses.

The sequence comprises temporal pulse spacings between temporally consecutive measurement pulses. Temporally consecutive measurement pulses are temporally adjacent measurement pulses. In other words, these are measurement pulses which are emitted one after the other. Each measurement pulse has a pulse width of T(Pulse), In particular, all the measurement pulses of the sequence are also configured identically in their shape.

The term "pulse spacing" is to be understood in particular not as pulse-to-pulse spacing, that is the spacing between the one pulse measured from its centre to the centre of the other pulse. Instead, the pulse spacing here defines the spacing between the opposite ends of the pulse. In other words, the temporal pulse spacing can be determined by taking the pulse-to-pulse spacing measured from the centres, wherein a pulse width of T(Pulse) is then subtracted. This takes into account that the pulse spacings are determined in the present case not from the centre but from the end of the pulse.

The pulse spacings form a set which is defined by {T(delay)+i*T(Pulse): i is an element of the natural numbers between 0 and j}. i is in particular to be understood as running index. i has values between 0 and j. In this case, it holds for all values of i: T(delay)+i*T(Pulse)<(2T(delay)+2T(Pulse)). In particular, the condition is not satisfied for all values greater than j. j thus defines the maximum pulse spacing which corresponds to T(delay)+j*T(Pulse).

It is crucial that the first set only comprises one element for each value of i between 0 and j. This means that despite the curved notation of the first set, elements of the first set can only occur once. The first set therefore finally consists of only one element for all values of i between 0 and j, respectively.

In particular the method comprises the determination of the first set. In this case, the condition for all values of i and specifically that T(delay)+i*T(Pulse)<(2T(delay)+2T(Pulse)) is a termination condition. This condition defines the largest element of the first set.

T(delay) is to be understood as the pulse spacing base unit since the smallest pulse spacing is precisely T(delay). The method preferably comprises the definition of T(delay). T(delay) can be defined as a minimal pause between two measurement pulses, for example, limited by the technical conditions of a transmitting unit for emitting the measurement pulses. T(delay) can however also be selected to be greater than the technically determined minimal pause between two measurement pulses. This results in longer sequences since the termination condition is reached later. Thus, T(delay) can intentionally be defined as greater than is technically necessary to produce longer sequences with more measurement pulses.

The method preferably comprises the definition of T(Pulse). T(Pulse) can in particular be defined as minimal pulse width. The minimal pulse width is technically determined since no transmitting unit can produce pulses having infinitely short duration. T(Pulse) can however also be selected to be larger than the technically determined minimal pulse width.

In particular, T(delay) and T(Pulse) can be defined in such a manner that T(delay)=T(Pulse). In this case, the above-mentioned termination condition is achieved for j=2. The first set therefore consists of the following elements: T(delay), T(delay)+T(Pulse), T(delay)+2*T(Pulse). The first set therefore comprises three elements so that the sequence overall comprises four measurement pulses between which the pulse spacings are arranged. In this case, the sequence of the pulse spacings is irrelevant.

In particular T(delay) corresponds to at least twice T(Pulse), preferably at least five times T(Pulse), further preferably at least ten times T(Pulse), most preferably at least 16 times T(Pulse).

In particular, it is advantageous if as a result of the definition of T(delay), the length of the sequence is lengthened in such a manner that overall less energy than is typically necessary (that is in a normal scan with a waiting between the pulses of twice the maximum transit time) would be necessary.

In particular, the first set comprises j+1 pulse spacings and the sequence j+2 measurement pulses. The number of measurement pulses within the sequence is therefore also defined by the termination condition which determines j.

In particular, the method comprises the emission of a first measurement pulse. Then an element from the first set, i.e. a pulse spacing is selected. This selected pulse spacing is waited until another measurement pulse is emitted. Thus, another but different element is selected from the first set, the time duration of which is again waited. Then a measurement pulse is emitted again. This is continued until each element of the first set has been selected once. Then a last measurement pulse is emitted and thus overall the sequence is emitted.

In particular, the method is a time-of-flight method, in particular a time correlated single photon counting method (TCSPC method).

An advantage of the method according to the invention lies in that the transit time of the sequence can be determined unambiguously in the evaluation. Furthermore an increase in the range can be achieved.

The maximum range is defined in the prior art by twice the transit time which a measurement pulse would need to be reflected back from an object located at the maximum distance to a device for carrying out the method. In the present case, however, despite the emission of a plurality of measurement pulses in a shorter time interval than the previously mentioned twice the maximum transit time, no aliasing effects occur and the energy is distributed over several measurement pulses. The emitted energy power and therefore also the range can be maximized. Furthermore a small distance range can be scanned in great width. In the prior art, after the emission of a measurement pulse it was necessary to wait for twice the transit time as far as the maximum range before another measurement pulse could be emitted to prevent aliasing effects. This is particularly obstructive if only a small region at a large distance is to be measured since the measurement of the small region takes a disproportionately long time due to the great distance from the device. With the present method the waiting time between the emission of neighbouring measurement pulses must only correspond to twice the length of the scanned distance region. In this case, how far this distance region is from the sensor is not important.

In particular, the sequence is emitted in such a manner that each pulse spacing is greater than the previous pulse spacing. This naturally does not apply to the first pulse spacing since a comparison with a previous pulse spacing of the same sequence is not possible. In other words, the pulse spacing of the sequence increases with increasing sequence. This means that the pulse spacings are arranged temporally in such a manner that firstly the smallest pulse spacing is waited and then the pulse spacings increase continuously up to the largest pulse spacing which corresponds to T(delay)+j*T(Pulse).

Alternatively the sequence can be emitted in such a manner that each pulse spacing is smaller than the previous pulse spacing. This again applies to all pulse spacings apart from the first pulse spacing since a comparison with a previous pulse spacing of the same sequence is not possible. The pulse spacing thus decreases with increasing sequence. The sequence is emitted in other words in such a manner that the pulse spacings after the emission of each measurement pulse decrease until the minimal pulse spacing T(delay) is achieved.

In particular, the method comprises the emission of a plurality of sequences. This plurality of sequences is preferably a succession of sequences. In particular all the sequences are identically configured and preferably as described above.

The emission and receipt of one sequence preferably defines a measurement run. The method preferably comprises the integration of the performed measurement runs. By integrating several measurement runs, the quality of the measurement can be improved.

In particular temporal sequence spacings can lie between several emitted sequences and specifically between temporally consecutive sequences. Each sequence preferably has a temporal length of T(Sequence) wherein the sequence spacings form a second set, wherein the second set is defined by {T(delay2)+i*T(Sequence): i is an element of the natural numbers between 0 and k}, wherein for all values of i it holds that: T(delay2)+i*T(Sequence)<(2T(delay2)+2T(Sequence)), and wherein the second set comprises only one element for all values of i between 0 and k, respectively. The second set preferably finally consists of respectively one element for all values of i between 0 and k. T(delay2) is to be understood as sequence spacing base unit. T(delay2) in particular defines the minimum spacing between two temporally consecutive sequences.

The sequence spacings are advantageously determined similarly to the pulse spacings not between the centres of two adjacent sequences but between two opposite ends of the adjacent sequences.

The method in particular comprises the evaluation of the received measurement pulses, wherein the evaluation comprises the application of an optimal filter and wherein the optimal filter comprises an adapted optimal filter.

In other words, the optimal filter is adapted to the sequence. Such a filter is mentioned as matching filter or correlation filter. In particular, the optimal filter is adapted in such a manner that the optimal filter comprises the temporally mirrored pattern of the sequence.

In other words, the sequence is defined by a pattern, wherein the optimal filter or its impulse response is defined by the temporally mirrored pattern. From the mathematical viewpoint, the sequence is described by a useful signal function. The object of the optimal filter consists in finding the useful signal function, i.e. the sequence in the received signal. The received signal is supplied to the optimal filter which is optimally adapted to the sequence. As a result of this adaption, it is possible that the optimal filter finds the known sequence, i.e. the known useful signal function within the received signal. From this the transit time of the sequence and thus the position of the object at which this was reflected can be concluded. In particular, the optimal filter is used for optimal determination of the temporal position of the sequence within the received signal.

As a result of the application of an optimal filter described above, it is achieved that a response is obtained as output, that is as a result at the output of the optimal filter, as autocorrelation, which apart from the correct position of the sequence, has minimal auxiliary maxima. In other words, the output of the optimal filter only has one principal maximum which is preferably of (j+2) times intensity, wherein j+2 is the number of measurement pulses in the sequence. All the other further maxima of the output are merely single, that is they have a single intensity. As a result, it can be avoided that the temporal position of the sequence is wrongly detected in the received signal.

The sequence of the pulse spacings of the first set within the sequence can be selected arbitrarily since in the evaluation no complete superposition of the sequence with an optimal filter is achieved which is not optimally adapted to the sequence. This can be used to suppress crosstalk of adjacent sensor pixels of a receiving unit.

If a plurality of sequences, i.e. a succession of sequences, are emitted, the optimal filter can preferably be matched similarly to the pattern of this succession of sequences.

In a further aspect, the invention relates to a device for carrying out the method described above. The device is thus configured to carry out a method according to the invention.

In particular, the device comprises a transmitting unit and a receiving unit. In particular, the transmitting unit comprises transmitting elements and the receiving unit comprises receiving elements, in particular sensor pixels. The transmitting elements and receiving elements are preferably combined on a transmitting matrix or a receiving matrix. A matrix can in particular be understood as a three-dimensional, in particular plate-shaped body on a surface of which the corresponding elements are arranged.

In particular, the device comprises a scanning device, preferably a LIDAR sensor. Preferably the sensor elements each comprise a laser whereas the receiving elements in particular are each formed by a diode, in particular by a single photon avalanche diode.

Further preferably the device comprises at least one evaluation unit which is preferably configured to act as time-to-digital converter. The evaluation unit is in particular configured to evaluate the received measurement pulses, in particular by using an optimal filter. The evaluation unit is further configured to determine the transit time of the sequence. Further preferably the device can comprise a control unit which is configured to correspondingly control the transmitting unit and/or the receiving unit and/or the evaluation unit to carry out the method. The control unit preferably comprises an application-specific circuit (ASIC) or a field programmable gate array (FPGA).

The present invention further relates to a computer program product which comprises a computer-readable storage medium on which a program is stored which, after it has been loaded into the memory of the computer, enables a computer to carry out a method described above, optionally in cooperation with a device described above. The invention further relates to a computer-readable storage medium on which a program is stored which, after it has been loaded into the memory of the computer, enables a computer to carry out a method described above, optionally in cooperation with a device described above.

PREFERRED EMBODIMENTS OF THE INVENTION

Figure 1:
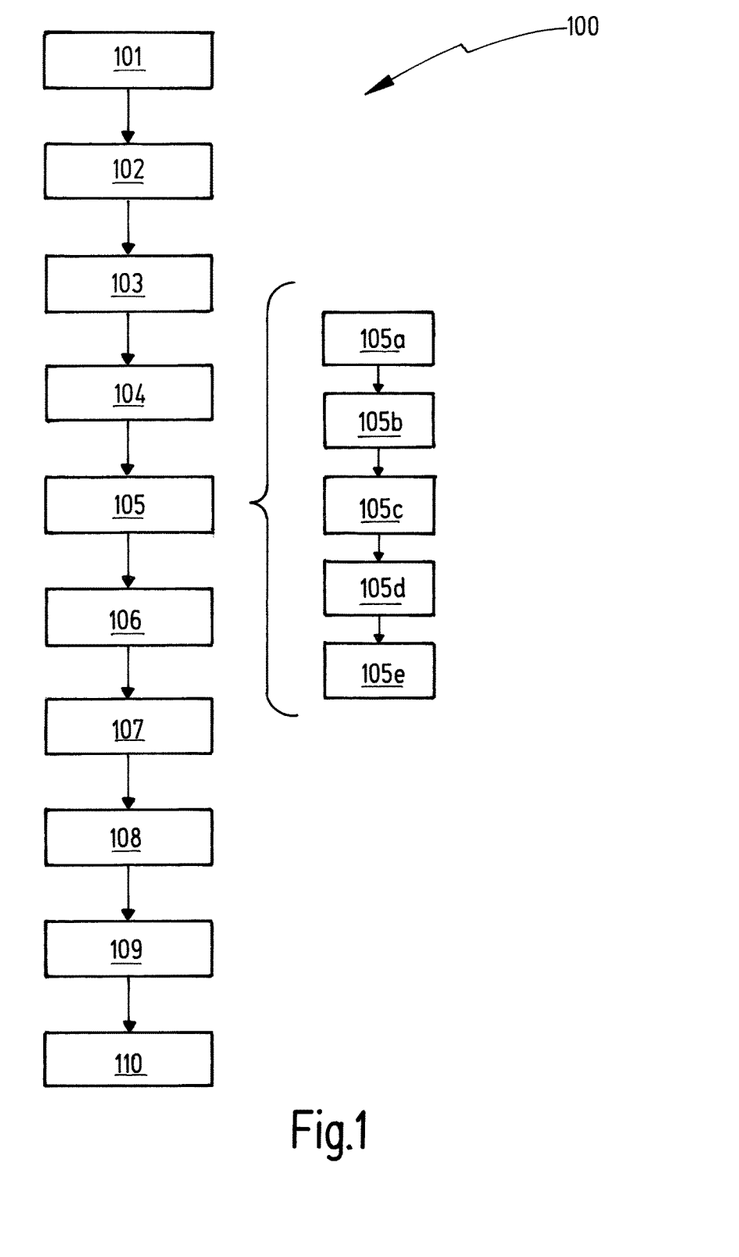
FIG. 1 shows a process diagram of a method according to the invention.

FIG. 1 shows a process diagram of a method (100) according to the invention.

The method (100) comprises the emission (101) of a plurality of measurement pulses (22), the reflection (102) of emitted measurement pulses at at least one object as well as the receiving (103) of reflected measurement pulses. According to the invention, a sequence (20) of measurement pulses (22) is emitted (105), wherein the pulse spacings (24) of the sequence (20) are defined by a first set.

Before emitting (105) the sequence (20), the first set is determined (104) by pulse spacings (24). This comprises in particular the definition of the temporal pulse width (23) of the measurement pulses to be emitted, i.e. T(Pulse). Further preferably the pulse spacing base unit T(Delay) is defined.

The first set is defined by {T(delay)+i*T(Pulse): i is an element of the natural numbers between 0 and j}, wherein for all values of i it holds that: T(delay)+i*T(Pulse)<(2T(delay)+2T(Pulse)), and wherein the first set only comprises one element for all values of i between 0 and j, respectively. Following definition of T(Delay) and T(Pulse), the first set can be finally be unambiguously determined.

The sequence (20) is in particular emitted (105) in such a manner that firstly a first measurement pulse (22a) is emitted (105a). Then a pulse spacing (24) from the first set of pulse spacings is waited (105b). Thus, an element is selected from the first set of pulse spacings and the corresponding time interval of the pulse spacing (24) is waited. This corresponds to the first pulse spacing (24a) of the sequence (20).

Then a further measurement pulse is emitted (105c), whereupon again another pulse spacing from the first set is waited (105d). To this end, an element is selected from the first set which had previously not yet been selected and its time interval waited. Then a further measurement pulse is emitted (105e), after which again another pulse spacing (24) not yet selected so far can be selected from the first set. This takes place until each element from the first set has been selected once. Then a last measurement pulse is emitted.

Preferably a plurality of sequences (20) can be emitted (106). In this case, in particular sequence spacings (26) between the emission of sequences (20) can be waited which are defined by a second set described above. The emission (106) of a plurality of sequences (20) can therefore previously determine the second set. The emission of the sequences (20) and the awaiting for the sequence spacings (26) or the selection of a sequence spacing (26) from the second set takes place similarly to that described above for the first set.

The received measurement pulses are preferably evaluated (107), wherein the evaluation preferably comprises the application (108) of an optimal filter (31). Within the framework of the evaluation the transit time of the sequence (20) is determined (109) and thus the distance from the object at which the sequence (20) was reflected is determined (110).

Figure 2:
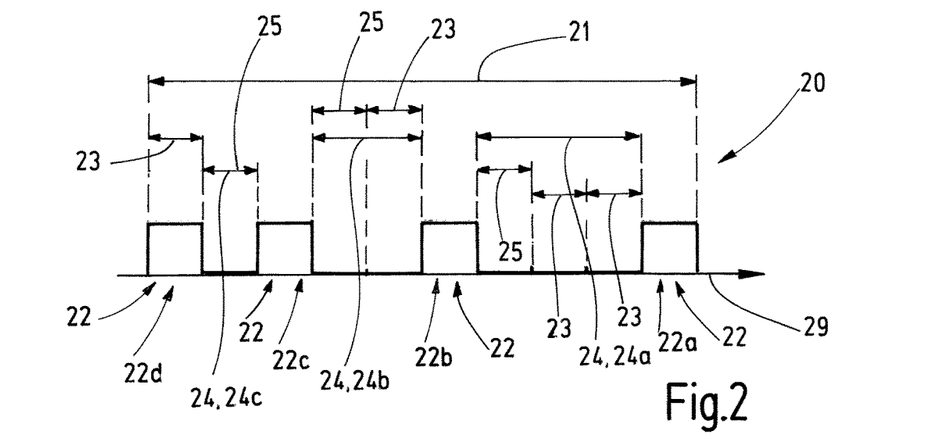
FIG. 2 shows a sequence which can be emitted with a method according to the invention.

FIG. 2 shows a sequence (200) which can be emitted with a method (100) according to the invention.

The sequence (20) has a length (21). The sequence (20) is shown on a time scale (29). The termination condition is here achieved for j=2. The first set consists of and certainly conclusively of the following elements: a pulse spacing base unit, a pulse spacing base unit plus one pulse width, a pulse spacing base unit plus two pulse widths, wherein each aforesaid element is only contained once in the first set.

The sequence (20) comprises four measurement pulses (22) and specifically a first measurement pulse (22a), a second measurement pulse (22b), a third measurement pulse (22c) and a fourth measurement pulse (22d). All the measurement pulses have T(Pulse) as pulse width (23). In other words, all the measurement pulses have the same pulse width (23).

First, the first measurement pulse (22a) is emitted (104a). Then a pulse spacing (24) from the first set of pulse spacings (24) and specifically the first pulse spacing (24a) is waited until a second measurement pulse (22) is emitted. The first pulse spacing (24a) amounts to a pulse spacing base unit (25) (T(delay) plus two pulse widths (23) T(Pulse).

After the emission of the second measurement pulse (22b), a pulse spacing (24), and specifically a second pulse spacing (24b) from the first set is awaited. The second pulse spacing (24b) amounts to a pulse spacing base unit (25) T(delay) plus a pulse width (23) T(Pulse). Then a third measurement pulse (22c) is emitted, after which a further pulse spacing (24) and specifically the third pulse spacing (24c) which amounts to a pulse spacing base unit (25) is waited. Finally a last measurement pulse (22) and specifically the fourth measurement pulse (22d) is emitted.

The length of the signal (21) is therefore four pulse widths (23) and six pulse spacing base units (25).

The measurement pulses (22) are emitted in such a manner that starting from the largest pulse spacing of the first set each pulse spacing is smaller than the previous one.

Figure 3:
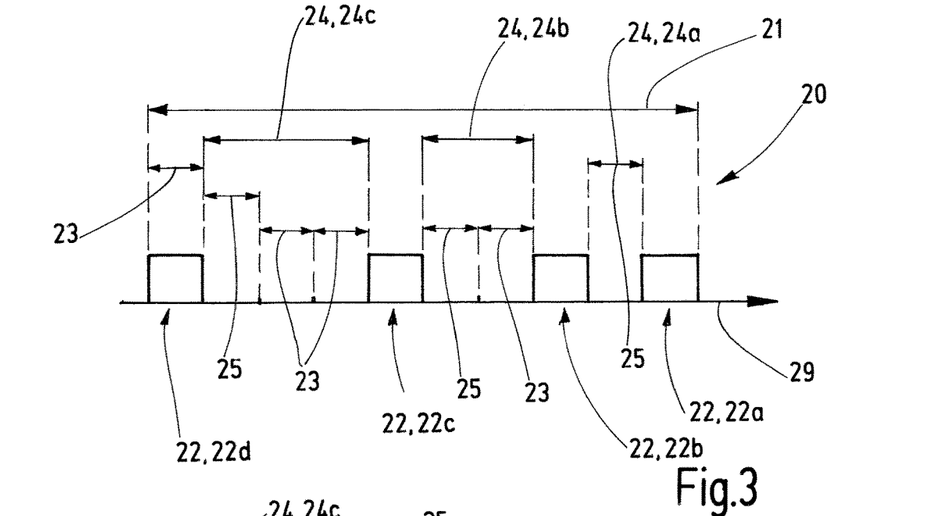
FIG. 3 shows a further sequence which is defined by the same first set as the sequence from FIG. 2.

FIG. 3 shows another sequence (20) which is defined by the same first set as the sequence from FIG. 2.

The pulse spacings (24) and specifically the first pulse spacing (24a), the second pulse spacing (24b) and the third pulse spacing (24c) originate from the same set. In this case, however, in contrast to FIG. 2, the smallest pulse spacing (24) of the first set now follows as first pulse spacing (24), then the second smallest pulse spacing (24) of the first set as second pulse spacing (24b) and the longest pulse spacings the last third pulse spacing (24c). In other words, the pulse spacings (24) are arranged mirrored in time compared to the sequence (20) of FIG. 2. The pulse spacings (24) thus increase with advancing sequence until the maximum pulse spacing (24), here the third pulse spacing (24c) is reached.

Figure 4:
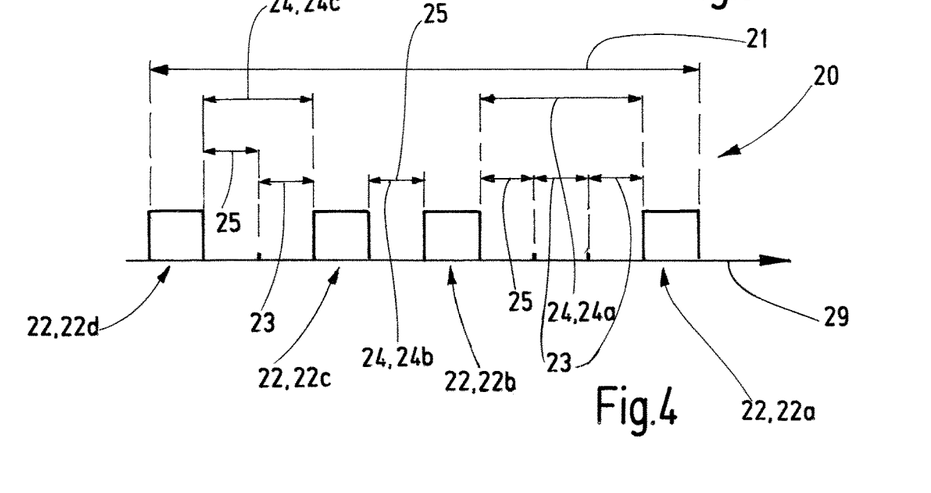
FIG. 4 shows a further sequence which is defined by the same first set as the sequences from FIGS. 2 and 3.

FIG. 4 shows a further sequence (20) which is defined by the first set like the sequences (20) of FIGS. 2 and 3.

Compared to the sequences (20) of FIGS. 2 and 3, the first pulse spacing (24a) in time is the longest pulse spacing (24) of the first set, whereupon after emission of a second measurement pulse (22b) as second pulse spacing (24b), the smallest element of the first set follows. As the last, a pulse spacing (24) is waited as third pulse spacing (24c) which corresponds to one pulse spacing base unit (25) and one pulse width (23).

Figure 5:
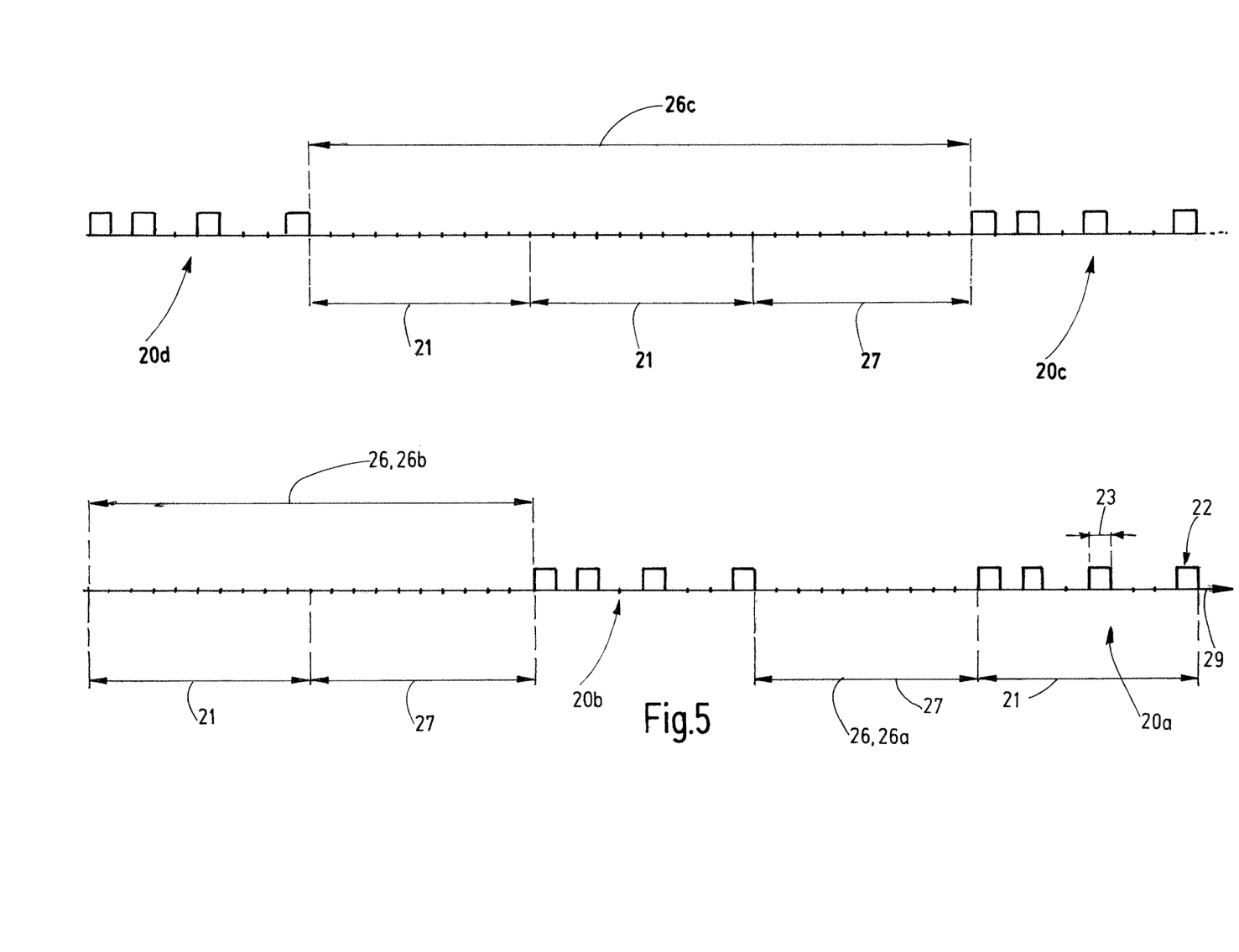
FIG. 5 shows a plurality of sequences which can be emitted according to the method according to the invention.

FIG. 5 shows a plurality of sequences (20) which can be emitted according to the method (100) according to the invention. The plurality of sequences (20) are shown on a time scale (29) which is interrupted for space reasons.

In this case, four sequences (20) are emitted, a first sequence (20a), a second sequence (20b), a third sequence (20c) and a fourth sequence (20d) which are all configured identically to one another. Each sequence (20) is configured as shown in FIG. 2.

Sequence spacings (26) are arranged between the sequences (20), and specifically a first sequence spacing (26a) between the first sequence (20a) and the second sequence (20b), a second sequence spacing (26b) between the second sequence (20b) and the third sequence (20c) and a third sequence spacing (26c) between the third sequence (20c) and the fourth sequence (20d).

In this case, the sequence spacings (26) form a second set which is given by the following elements: a sequence spacing base unit (27), a sequence spacing base unit (27) plus one sequence length (21), a sequence spacing base unit (27) plus two sequence lengths (21). Here the sequence length (21) preferably correspond to the sequence spacing base unit (27).

Figure 6:
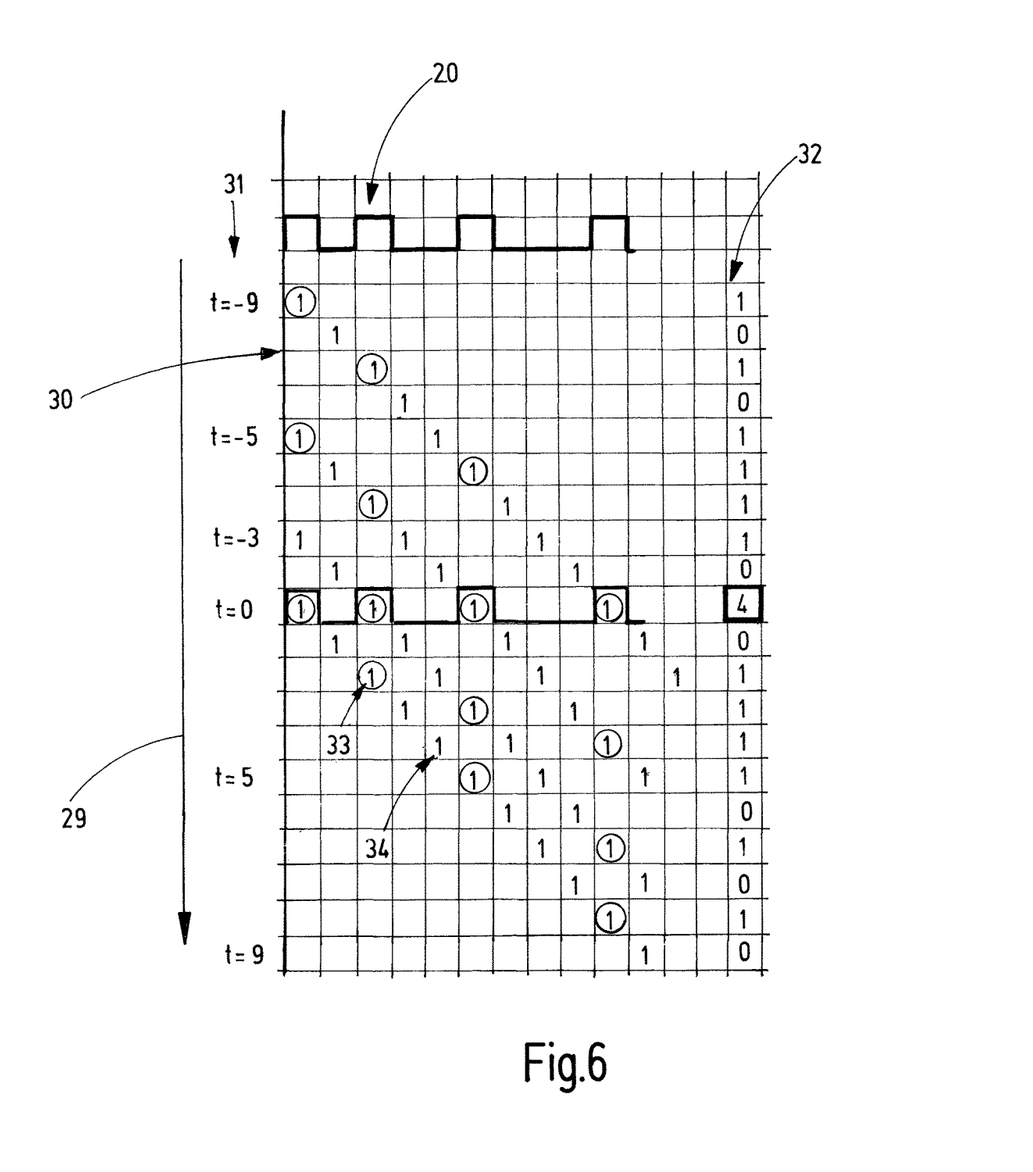
FIG. 6 shows the temporal course of a "matching" with an optimal filter.

FIG. 6 shows the time course of a "matching" of a received signal with an optimal filter (30).

The sequence (20) which was emitted and which is contained in the received signal is configured similarly to the sequence of FIG. 2.

Along a time scale (29) it is shown how an optimal filter (30), in other words a matching filter, runs over the received signal. In addition to the time scale (29), the time offset (31) of the optimal filter (30) is shown. The optimal filter (30) is configured in such a manner that it has a pattern which is time-mirrored with respect to the pattern of the sequence (20). This can be seen from the fact that the ones in the time behaviour direction shown in FIG. 6 firstly having a spacing from one another which corresponds to the third pulse spacing of the sequence, then a spacing which corresponds to the second pulse spacing and then a spacing which corresponds to the first pulse spacing. Zeroes not shown are arranged between the ones. The optimal filter (30) with time-mirrored pattern is successively, i.e. descendingly downwards along the time scale (29) correlated over the received signal comprising the sequence (20).

As soon as the optimal filter (30) encounters a measurement pulse (22), a match (33) is registered. Otherwise no match (34) is the result. Matches (33) are shown in FIG. 6 in such a manner that the corresponding one is circled.

The output (32) of the optimal filter (30) is shown in the right-hand column. The output (32) at a certain time is a sum of the matches (33) in the corresponding line. For example, in the first line (at T=9) only one match (33) has been established. The same applies to the third line and the fifth line. Only at the time T=0 does the output (32) have a result of 4, that is four matches (33) were identified for the same time. Apart from this principal maximum of 4 at time T=0, the output has no further maximum but only auxiliary maxima which are easy to distinguish from the principal maximum which are only 1.

With the aid of the optimal filter (30), it can thus be unambiguously determined that the sequence (20) was received at time T=0. Since the receiving time and therefore the transit time of the sequence (2) can be ascertained, the distance from an object at which the sequence (20) was reflected can be unambiguously determined.

The invention claimed is:

1. A method for optical distance measurement,
    wherein the method comprises the emission of a plurality of measurement pulses, the reflection of emitted measurement pulses at at least one object and the receipt of reflected measurement pulses,
    wherein a sequence of measurement pulses is emitted,
    wherein the sequence comprises temporal pulse spacings between temporally successive measurement pulses,
    wherein each measurement pulse of the sequence has a temporal pulse width of T(Pulse),
    wherein the pulse spacings form a first set,
    wherein the first set is defined by $\{T(delay)+i*T(Pulse): i$ is an element of the natural numbers between 0 and $j\}$,
    wherein for all values of i it holds that: $T(delay)+i*T(Pulse)<(2T(delay)+2T(Pulse))$,
    wherein the first set only comprises one element for all values of i between 0 and j, respectively, and wherein T(delay) defines a pulse spacing base unit.

2. The method according to claim 1,
    wherein the method comprises the definition of T(delay) and/or T(Pulse).

3. The method according to claim 1,
    wherein $T(delay) \geq T(Pulse)$.

4. The method according to claim 1,
    wherein T(delay) corresponds to at least 2*T(Pulse), preferably at least 5*T(Pulse), further preferably at least 10*T(Pulse), most preferably at least 16*T(Pulse).

5. The method according to claim 1,
    wherein the method comprises determining the first set.

6. The method (100) according to claim 1,
    wherein the sequence is emitted in such a manner that each pulse spacing is greater than the previous pulse spacing.

7. The method according to claim 1,
    wherein the sequence is emitted in such a manner that each pulse spacing is smaller than the previous pulse spacing.

8. The method according to claim 1,
    wherein the method comprises the emission of a plurality of sequences.

9. The method according to claim 8,
    wherein temporal sequence spacings are arranged between temporally successive sequences,
    wherein each sequence has a temporal length of T(Sequence),
    wherein the sequence spacings form a second set,
    wherein the second set is defined by $\{T(delay2)+i*T(Sequence): i$ is an element of the natural numbers between 0 and $k\}$,
    wherein for all values of i it holds that: $T(delay2)+i*T(Sequence)<(2T(delay2)+2T(Sequence))$,
    wherein the second set only comprises one element for all values of i between 0 and k, respectively, and wherein T(delay2) defines a sequence spacing base unit.

10. The method according to claim 1,
    wherein the method comprises the evaluation of the receiving measurement pulses,
    wherein the evaluation comprises the application of an optimal filter, and
    wherein the optimal filter comprises an adapted optimal filter.

11. The method according to claim 10,
    wherein the sequence comprises a pattern,
    wherein the optimal filter is adapted in such a manner that the optimal filter comprises the temporally reflected pattern.

12. A device for optical distance measurement,
    wherein the device is configured to carry out a method according to claim 1.

13. A computer program product which comprises a computer-readable storage medium on which a program is stored which, after it has been loaded into the memory of the computer, enables a computer to carry out a method according to claim 1.

14. A computer-readable storage medium on which a program is stored which, after it has been loaded into the memory of the computer, enables a computer to carry out a method according to claim 1.

* * * * *

UNITED STATES PATENT AND TRADEMARK OFFICE
CERTIFICATE OF CORRECTION

PATENT NO. : 11,506,761 B2
APPLICATION NO. : 16/548156
DATED : November 22, 2022
INVENTOR(S) : Michael Kiehn et al.

It is certified that error appears in the above-identified patent and that said Letters Patent is hereby corrected as shown below:

On the Title Page

Item (30), change "18190429" to --18190429.3--.

Signed and Sealed this
Twenty-first Day of March, 2023

*Katherine Kelly Vidal*
*Director of the United States Patent and Trademark Office*